(12) United States Patent
Nakajima et al.

(10) Patent No.: US 11,334,296 B2
(45) Date of Patent: May 17, 2022

(54) SERVICE PROVIDING SYSTEM, SERVICE PROVIDING SYSTEM CONTROL METHOD, AND INFORMATION PROCESSING APPARATUS

(71) Applicant: SEIKO EPSON CORPORATION, Tokyo (JP)

(72) Inventors: Norihiko Nakajima, Matsumoto (JP); Diego Albergoni, Watford (GB); Mauro Bartoletti, Milan (IT); Alberto Raviolo, Brugherio (IT)

(73) Assignee: Seiko Epson Corporation, Tokyo (JP)

( * ) Notice: Subject to any disclaimer, the term of this patent is extended or adjusted under 35 U.S.C. 154(b) by 72 days.

(21) Appl. No.: 17/081,469

(22) Filed: Oct. 27, 2020

(65) Prior Publication Data

US 2021/0124535 A1 Apr. 29, 2021

(30) Foreign Application Priority Data

Oct. 28, 2019 (JP) .............................. JP2019-195556

(51) Int. Cl.
*G06F 3/12* (2006.01)
*G06Q 30/00* (2012.01)
*G06Q 10/10* (2012.01)
*G06Q 20/14* (2012.01)

(52) U.S. Cl.
CPC .......... *G06F 3/1205* (2013.01); *G06F 3/1229* (2013.01); *G06Q 10/10* (2013.01); *G06Q 30/016* (2013.01); *G06Q 20/145* (2013.01)

(58) Field of Classification Search
CPC ...... G06F 3/1205; G06F 3/1229; G06Q 10/10
USPC ......................................................... 358/1.13
See application file for complete search history.

(56) References Cited

U.S. PATENT DOCUMENTS

| | | | |
|---|---|---|---|
| 2001/0025260 A1* | 9/2001 | Blumofe | G06Q 30/0609 705/26.35 |
| 2014/0250465 A1* | 9/2014 | Mulholland | H04N 21/47211 725/60 |
| 2020/0379741 A1* | 12/2020 | Vidnovic | H04L 67/26 |

FOREIGN PATENT DOCUMENTS

JP 2018-190155 11/2018

* cited by examiner

*Primary Examiner* — Thomas J Lett
(74) *Attorney, Agent, or Firm* — Workman Nydegger

(57) ABSTRACT

A service providing system includes a service providing server that provides a printer use service, and a terminal device, wherein the terminal device accepts a request by a user for withdrawal from the printer use service, and transmits, to the service providing server, request-for-withdrawal information indicating the accepted request for withdrawal, wherein the service providing server, when receiving the request-for-withdrawal information, determines an alternative fee plan that is different from a selected fee plan that the user has selected based on the form of use by the user of the printer use service, and transmits the alternative fee plan information indicating the determined alternative fee plan to the terminal device, and wherein the terminal device presents to the user the alternative fee plan indicated by the received alternative fee plan information.

13 Claims, 7 Drawing Sheets

FIG. 4

| SERIAL NUMBER | INK AMOUNT INFORMATION | TOTAL PRINTED SHEET NUMBER INFORMATION | LOG FILE |
|---|---|---|---|
| 113F | 114A | 114B | 114C |

114

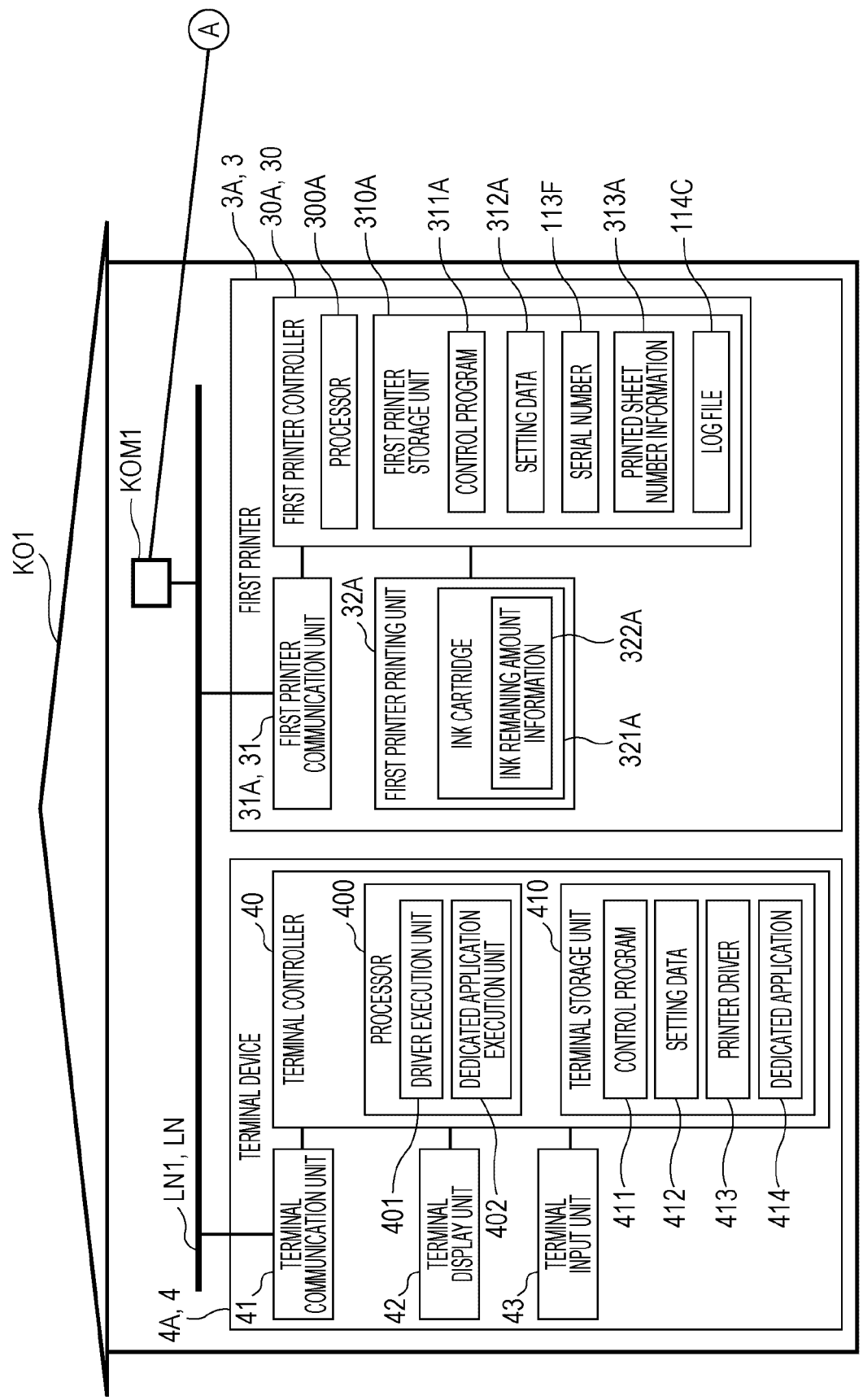

SERVICE PROVIDING SYSTEM, SERVICE PROVIDING SYSTEM CONTROL METHOD, AND INFORMATION PROCESSING APPARATUS

The present application is based on, and claims priority from JP Application Serial Number 2019-195556, filed Oct. 28, 2019, the disclosure of which is hereby incorporated by reference herein in its entirety.

BACKGROUND

1. Technical Field

The present disclosure relates to a service providing system, a service providing system control method, and an information processing apparatus.

2. Related Art

In the related art, services related to the use of printing apparatus are known. For example, JP-A-2018-190155 discloses a service for ordering consumable items for a printing apparatus as a service related to the use of the printing apparatus. Further, JP-A-2018-190155 discloses a technique of presenting information for introducing a service to a user who has not joined the service for ordering consumable items for the printing apparatus to urge the user to join the service.

Generally, when joining the service as described in JP-A-2018-190155, a fee plan in which the service content and the usage fee are defined is presented. However, in the related art, no fee plan is presented when withdrawing from the service related to the use of the printing apparatus. Therefore, although there is a fee plan suitable for the form of use of the user, the user may withdraw from the service related to the use of the printing apparatus without knowing the fee plan.

SUMMARY

According to an aspect of the present disclosure, a service providing system includes an information processing apparatus that provides a service related to use of a printing apparatus, and a terminal device configured to communicate with the information processing apparatus, wherein the terminal device accepts a request by a user for withdrawal from the service to transmit request-for-withdrawal information indicating the accepted request for withdrawal to the information processing apparatus, wherein the information processing apparatus, when receiving the request-for-withdrawal information from the terminal device, determines, based on a form of use by the user of the service, a second fee plan different from a first fee plan which is a fee plan of the service selected by the user when receiving the request-for-withdrawal information, and transmits second fee plan information indicating the determined second fee plan to the terminal device, and wherein the terminal device presents to the user the second fee plan indicated by the second fee plan information received from the information processing apparatus.

The above service providing system may have a configuration in which the information processing apparatus receives printed sheet number information indicating the number of sheets on which printing is performed by the printing apparatus, and determines the second fee plan based on the printed sheet number information.

The above service providing system may have a configuration in which the information processing apparatus creates a new fee plan based on the printed sheet number information and the first fee plan, and sets the created fee plan as the second fee plan.

The above service providing system may have a configuration in which the information processing apparatus determines whether to transmit the second fee plan information to the terminal device based on the form of use, transmits the second fee plan information to the terminal device when it is determined that the second fee plan information is transmitted, and does not transmit the second fee plan information to the terminal device when it is determined that the second fee plan information is not transmitted.

The above service providing system may have a configuration in which the information processing apparatus determines that the second fee plan information is transmitted to the terminal device when a period of use by the user of the service is within a predetermined range, and determines that the second fee plan information is not transmitted to the terminal device when a period of use by the user of the service is not within the predetermined range.

The above service providing system may have a configuration in which the information processing apparatus calculates a ratio between an income and an expense generated by use by the user of the service, and determines that the second fee plan information is not transmitted to the terminal device when the calculated ratio is below a predetermined threshold value.

The above service providing system may have a configuration in which the information processing apparatus determines that the second fee plan information is not transmitted to the terminal device when a payment status of a fee of use by the user of the service is unpaid.

The above service providing system may have a configuration in which the information processing apparatus transmits the second fee plan information to the terminal device when a predetermined time elapses since the second fee plan information was transmitted to the terminal device last time, and does not transmit the second fee plan information to the terminal device when it is determined that the predetermined time does not elapse since the second fee plan information was transmitted to the terminal device last time.

The above service providing system may have a configuration in which the information processing apparatus transmits the second fee plan information to the terminal device when the number of times the second fee plan information was transmitted to the terminal device in the past is less than a predetermined number of times, and does not transmit the second fee plan information to the terminal device when the number of times the second fee plan information was transmitted to the terminal device in the past is equal to or greater than the predetermined number of times.

The above service providing system may have a configuration in which the second fee plan is different from the fee plan selected by the user when the user joins the service.

The above service providing system may have a configuration in which the fee plan is a plan in which at least a usage fee of the service in a given period and the number of printed sheets on which the printing apparatus is configured to perform printing in the given period are defined.

According to another aspect of the present disclosure, in a method of controlling a service providing system including an information processing apparatus that provides a service related to use of a printing apparatus, and a terminal device configured to communicate with the information processing apparatus, the method includes the terminal device accepting a request by a user for withdrawal from the service, and transmitting request-for-withdrawal information indicating the accepted request for withdrawal to the information processing apparatus, the information processing apparatus, when receiving the request-for-withdrawal information from the terminal device, determining, based on a form of use by the user of the service, a second fee plan different from a first fee plan which is a fee plan of the service selected by the user when receiving the request-for-withdrawal information, and transmitting second fee plan information indicating the determined second fee plan to the terminal device, and the terminal device presenting to the user the second fee plan indicated by the second fee plan information received from the information processing apparatus.

According to still another aspect of the present disclosure, in an information processing apparatus that provides a service related to use of a printing apparatus, the information processing apparatus includes a communication unit that receives, from a terminal device that accepts a request by a user for withdrawal from the service, request-for-withdrawal information indicating the request for withdrawal accepted by the terminal device, and a controller that when the communication unit receives the request-for-withdrawal information from the terminal device, determines, based on a form of use by the user of the service, a second fee plan different from a first fee plan which is a fee plan of the service selected by the user when receiving the request-for-withdrawal information to transmit second fee plan information indicating the determined second fee plan to the terminal device through the communication unit.

BRIEF DESCRIPTION OF THE DRAWINGS

FIG. 4 is a diagram illustrating an example of a printer management database.

FIG. 5B is a second half of the block diagram showing the functional configuration of the service printer and the terminal device.

DESCRIPTION OF EXEMPLARY EMBODIMENTS

Figure 1:
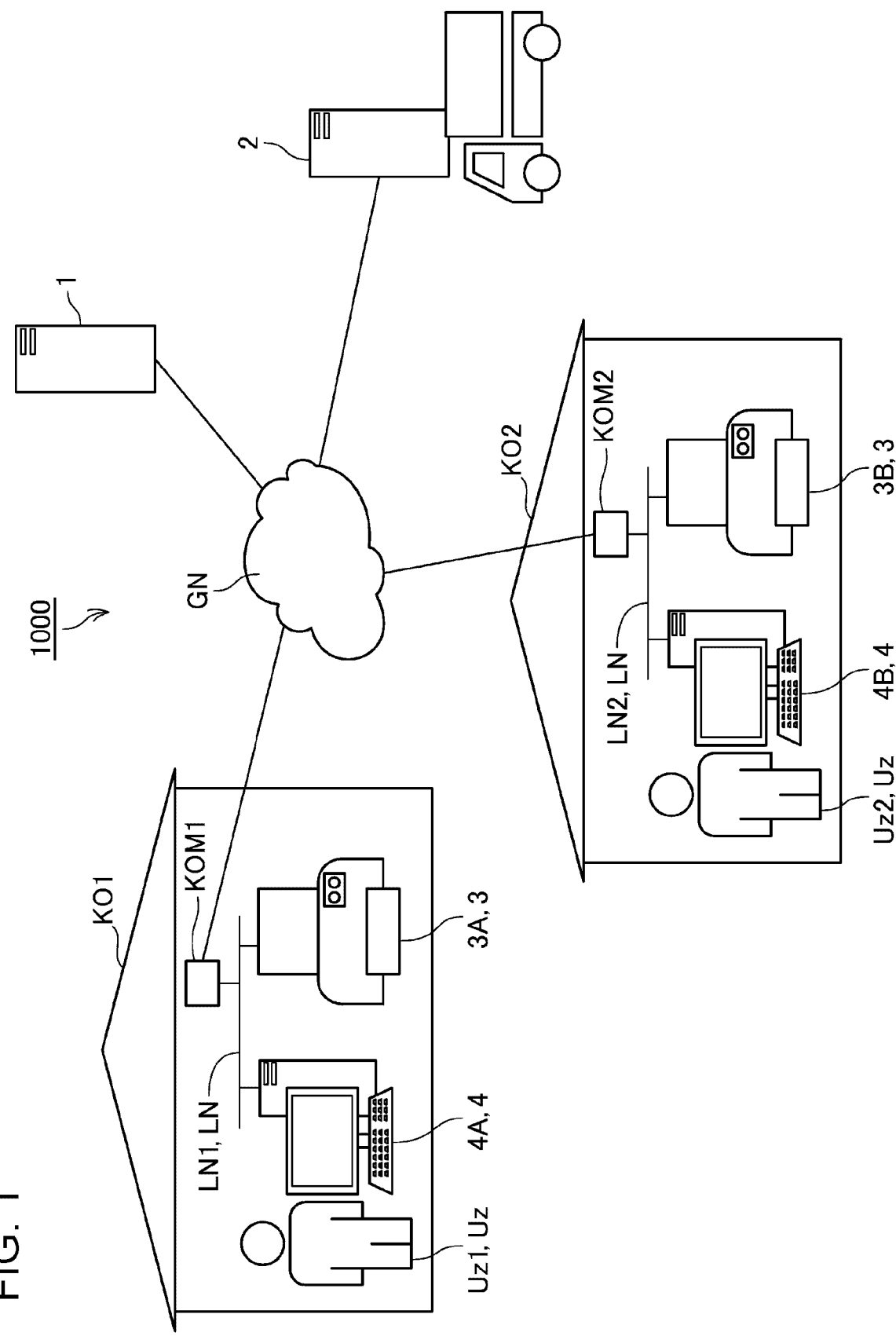
FIG. 1 is a diagram showing a configuration of a service providing system.

FIG. 1 is a diagram showing a configuration of a service providing system 1000. The service providing system 1000 is a system that provides services related to the use of a printer. In the following description, the service related to the use of the printer is referred to as a "printer use service". The printer use service is a service in which a user pays a usage fee for using the printer for a given period, and is a so-called subscription-type service. In the present embodiment, the service providing system 1000 provides two types of printer use services, that is, a first printer use service and a second printer use service. The first printer use service and the second printer use service will be described later.

The service providing system 1000 includes a service providing server 1. The service providing server 1 corresponds to an example of an information processing apparatus. The service providing server 1 is a server apparatus that provides a printer use service. The service providing server 1 is connected to a global network GN including the Internet, a telephone network, and other communication networks, and communicates with devices connected to the global network GN. The service providing server 1 is owned by, for example, a company that runs the printer use service. Although the service providing server 1 is represented by one block in each figure, this does not necessarily mean that the service providing server 1 is configured by a single server apparatus. For example, the service providing server 1 may be configured to include a plurality of server apparatus having different processing contents.

The service providing system 1000 includes a delivery server 2. The delivery server 2 is a server apparatus that instructs a delivery person to deliver a delivery items. The delivery server 2 is owned by, for example, a company that is entrusted with the delivery work by a company that runs the printer use service, and issues a delivery instruction to deliver the delivery item to a delivery person who is an employee of the entrusted company. The delivery server 2 is connected to the global network GN and communicates with a device connected to the global network GN. In the present embodiment, the delivery items instructed by the delivery server 2 for delivery are different between the first printer use service and the second printer use service. The delivery item in the first printer use service is a consumable item for the printer used in the first printer use service. The delivery items in the second printer use service are the printer used in the second printer use service and the consumable item for the printer. In the present embodiment, ink is exemplified as a consumable item for the printer. Although the delivery server 2 is represented by one block in each figure, this does not necessarily mean that the delivery server 2 is configured by a single server apparatus. For example, the delivery server 2 may be configured to include a plurality of server apparatus having different processing contents.

In the following description, the printer used in the first printer use service will be referred to as a "first printer" and will be denoted by the symbol "3A". Further, the printer used in the second printer use service is referred to as a "second printer" and will be denoted by the symbol "3B". The first printer 3A is a printer purchased by a user of the first printer use service at a store or the like, and is a property of the user. On the other hand, the second printer 3B is a property of the main entity that runs the second printer use service. Further, in the following description, when the first printer 3A and the second printer 3B are collectively referred to without distinction, they each are referred to as a "service printer" and will be denoted by the symbol "3". The service printer 3 corresponds to an example of a printing apparatus.

The service providing system 1000 includes one or more service printers 3. In the present embodiment, the case where the service providing system 1000 includes one first printer 3A and one second printer 3B is illustrated. Further, in each figure, the case where the second printer 3B is delivered to a house KO2 according to the delivery instruction by the delivery server 2 is shown.

The first printer 3A is a printing apparatus in which an ink cartridge 321A is mounted and which receives the ink from the mounted ink cartridge 321A to perform printing. The second printer 3B is a continuous ink supply system (CISS) type printing apparatus in which an ink tank 321B that supplies the ink to an ink jet head can be separately filled with the ink.

The first printer 3A is connected to a local network LN1 laid in a house KO1, and communicates with a device connected to the global network GN via a house communication device KOM1 connected to the local network LN1. Further, the first printer 3A communicates with a terminal device 4A connected to the local network LN1. The second printer 3B is connected to a local network LN2 laid in the house KO2, and communicates with a device connected to the global network GN via a house communication device KOM2 connected to the local network LN2. The second printer 3B also communicates with a terminal device 4B connected to the local network LN2.

The house communication devices KOM1 and KOM2 are interface devices that connect a local network LN and the global network GN. The house communication devices KOM1 and KOM2 have a function related to a modem or an optical network unit (ONU), a router function, a network address translation (NAT) function, a dynamic host configuration protocol (DHCP) server function, and the like. The house communication devices KOM1 and KOM2 transfer data transmitted and received between the devices when the communication is performed between the device connected to the local network LN and the device connected to the global network GN. In each figure, the house communication devices KOM1 and KOM2 are represented by one block, but the house communication devices KOM1 and KOM2 may have a configuration having a plurality of devices according to functions.

The service providing system 1000 includes two terminal devices 4 which are the terminal devices 4A and 4B. The service providing system 1000 may include more terminal devices 4. The terminal device 4A is a computer. The terminal device 4A is connected to the local network LN1, and communicates with the first printer 3A connected to the local network LN1 and a device connected to the global network GN. The terminal device 4B is a computer. The terminal device 4B is connected to the local network LN2, and communicates with the second printer 3B connected to the local network LN2 and a device connected to the global network GN.

The terminal device 4 shown in FIG. 1 exemplifies a desktop computer, but it may be a laptop computer or a tablet computer. When the terminal device 4 can be connected to the global network GN without via the local network LN, the terminal device 4 may communicate with a device connected to the global network GN without via the local network LN. Further, the terminal device 4 may communicate with the service printer 3 by a one-to-one communication method. An example of this communication method is a direct communication method in which wireless communication is performed without via an access point such as Wi-Fi Direct. Wi-Fi is a registered trademark.

In the present embodiment, a user Uz1 is a user of the first printer use service who has performed a membership registration of the first printer use service. The user Uz1 is a user Uz who owns the terminal device 4A. In the first printer use service, the ink consumed by the first printer 3A purchased by the user is delivered to the delivery destination designated by the user of the first printer use service. In the first printer use service, the ink cartridge 321A which is filled with the ink is delivered. In FIG. 1, in the first printer use service, the ink cartridge 321A that can be attached to the first printer 3A is delivered to the house KO1 designated by the user Uz1 as the delivery destination by the main entity that owns the delivery server 2.

A plurality of fee plans that the user can subscribe is set in the first printer use service. The fee plan defines the usage fee paid by the user of the printer use service for a given period and the number of print media on which printing by the service printer 3 can be performed without charge during the given period. In the following description, the number of print media on which printing by the service printer 3 can be performed without charge is simply referred to as "the number of printable sheets". In the present embodiment, three fee plans of a first service fee plan to a third service fee plan are set in the first printer use service. In the present embodiment, for the fee plan, a fee plan with one month as the given period is exemplified.

The first service fee plan is a fee plan in which the usage fee per month is X1 and the number of printable sheets per month is Y1. The second service fee plan is a fee plan in which the usage fee per month is X2 (X2<X1) and the number of printable sheets per month is Y2 (Y2<Y1). The third service fee plan is a fee plan in which the usage fee per month is X3 (X3<X2) and the number of printable sheets per month is Y3 (Y3<Y2).

The first service fee plan, the second service fee plan, and the third service fee plan are merely an example, and the usage fee, the unit of the usage fee, and the number of printable sheets are not limited to those described above. The first service fee plan, the second service fee plan, and the third service fee plan may have different usage fees and different numbers of printable sheets for respective fee plans.

The user Uz1 selects one fee plan from the first service fee plan, the second service fee plan, and the third service fee plan when performing a membership registration of the first printer use service. The user Uz1 pays the usage fee defined in the selected fee plan every month. Further, when performing printing after exceeding the number of printable sheets, the user Uz1 pays the excessive charge together with the usage fee defined in the fee plan.

In the present embodiment, a user Uz2 is a user of the second printer use service who has performed a membership registration of the second printer use service. The user Uz2 is the user Uz who owns the terminal device 4B. In the second printer use service, the second printer 3B and the ink cartridge or the ink bottle that stores the ink consumed by the second printer 3B are delivered to the delivery destination designated by the user. In the second printer use service, the ink bottle is delivered. In the second printer use service, the ink cartridge 321A is not delivered. In the case of FIG. 1, in the second printer use service, to the house KO2 designated by the user Uz2 as the delivery destination, the second printer 3B and the ink consumed by the second printer 3B are delivered by the main entity that owns the delivery server 2.

As in the first printer use service, a plurality of fee plans that the user can subscribe is set in the second printer use service. In the present embodiment, three fee plans of a fourth service fee plan to a sixth service fee plan are set in the second printer use service.

The fourth service fee plan is a fee plan in which the usage fee per month is X4 and the maximum number of printable sheets per month is not set. The fifth service fee plan is a fee plan in which the usage fee per month is X5 (X5<X4) and the number of printable sheets per month is Y5. The sixth service fee plan is a fee plan in which the usage fee per month is X6 (X6<X5) and the number of printable sheets per month is Y6 (Y6<Y5).

The fourth service fee plan, the fifth service fee plan, and the sixth service fee plan are merely an example, and the usage fee, the unit of the usage fee, and the number of printable sheets are not limited to those described above.

The fourth service fee plan, the fifth service fee plan, and the sixth service fee plan may have different usage fees and different numbers of printable sheets for respectable fee plans.

The user Uz2 selects one fee plan from the fourth service fee plan, the fifth service fee plan, and the sixth service fee plan when performing a membership registration of the second printer use service. The user Uz2 pays the usage fee defined in the selected fee plan every month. Further, when performing printing after exceeding the number of printable sheets, the user Uz2 pays the excessive charge together with the usage fee defined in the fee plan.

In the present embodiment, the case where one user Uz uses the first printer use service is illustrated, but there may be a plurality of users of the first printer use service. The same applies to the second printer use service. Further, the user of the printer use service is not limited to a person, but may be the main entity such as a company.

Figure 2:
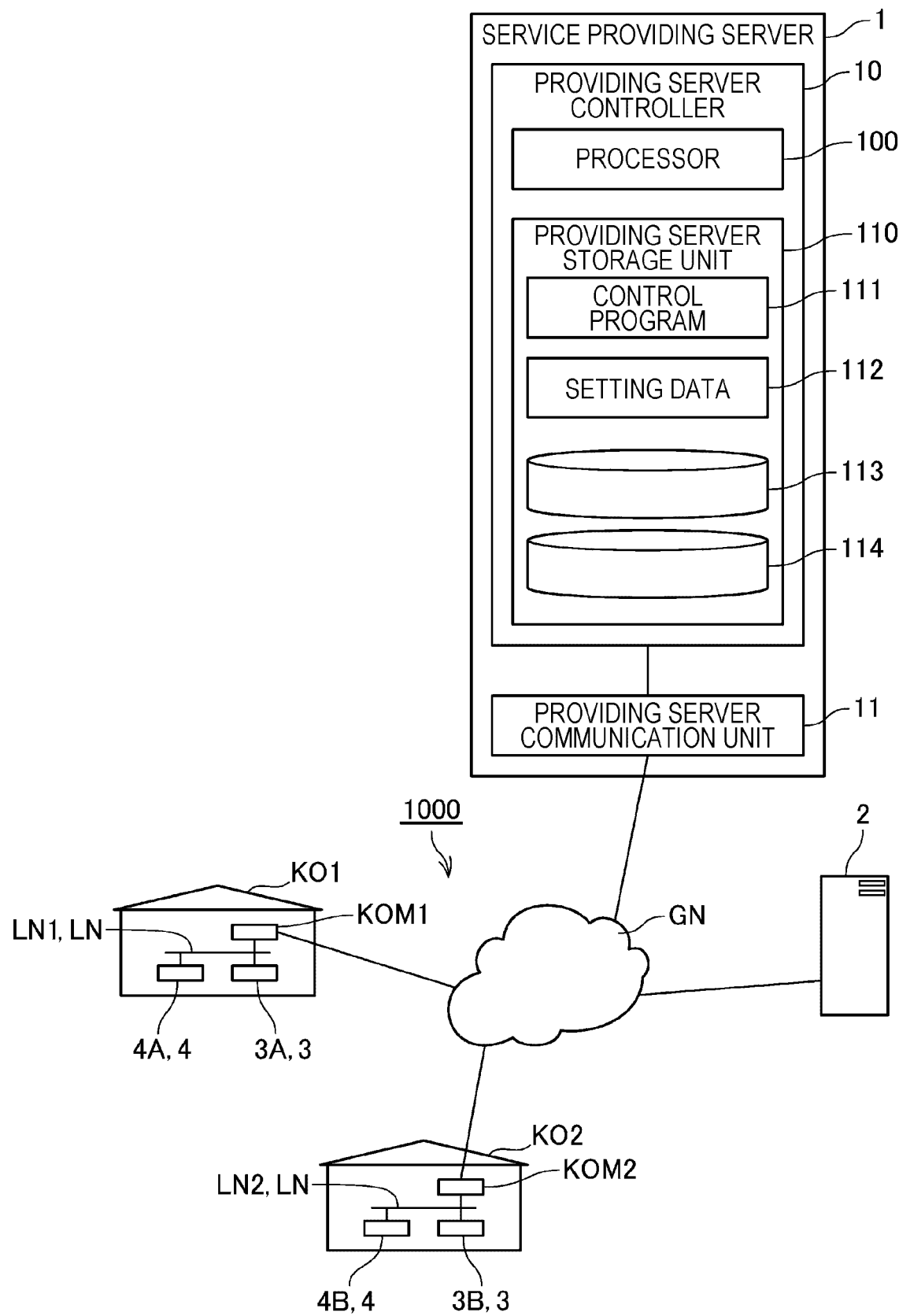
FIG. 2 is a block diagram showing a functional configuration of a service providing server.

Next, a functional configuration of each device of the service providing system 1000 will be described. First, the functional configuration of the service providing server 1 will be described. FIG. 2 is a block diagram showing a functional configuration of the service providing server 1.

The service providing server 1 includes a providing server controller 10. The providing server controller 10 corresponds to an example of a controller. The providing server controller 10 includes a processor 100 that executes programs such as a CPU and an MPU, and a providing server storage unit 110, and controls respective units of the service providing server 1. The providing server controller 10 performs various processes in cooperation with hardware and software so that the processor 100 reads a control program 111 stored in the providing server storage unit 110 and executes the processes.

The providing server storage unit 110 has a storage area in which a program executed by the processor 100 and data processed by the processor 100 stored. The providing server storage unit 110 stores the control program 111 executed by the processor 100 and setting data 112 including various setting values related to the operation of the service providing server 1. The providing server storage unit 110 has a nonvolatile storage area in which programs and data are stored in a nonvolatile manner. Further, the providing server storage unit 110 may include a volatile storage area and may be configured to temporarily store a program executed by the processor 100 and data to be processed.

The providing server storage unit 110 stores an account management database 113 and a printer management database 114 in addition to the control program 111 and the setting data 112.

First, the account management database 113 will be described. The account management database 113 is a database that manages the account given to a member of the printer use service provided by the service providing server 1.

Figure 3:
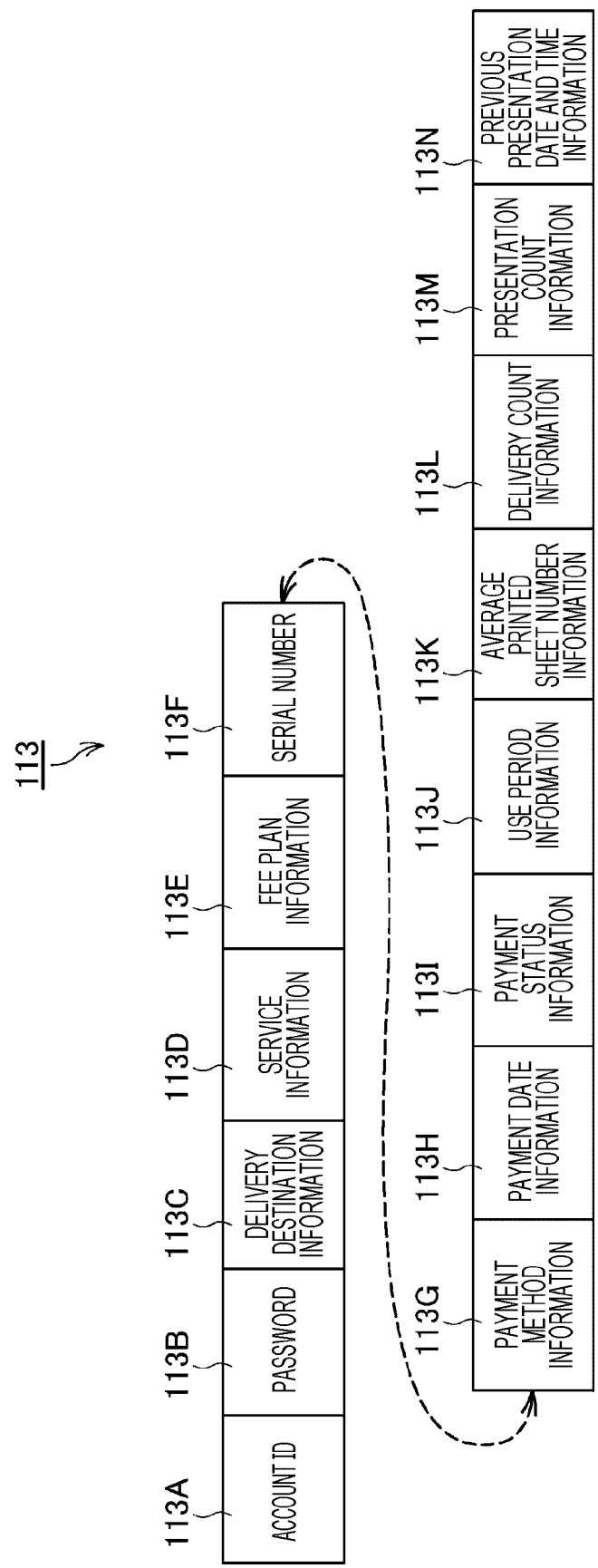
FIG. 3 is a diagram showing an example of an account management database.

FIG. 3 is a diagram schematically showing information included in one record of the account management database 113. As shown in FIG. 3, one record of the account management database 113 includes an account ID 113A, a password 113B, delivery destination information 113C, service information 113D, fee plan information 113E, a serial number 113F, payment method information 113G, payment date information 113H, payment status information 113I, use period information 113J, average printed sheet number information 113K, delivery count information 113L, presentation count information 113M, and previous presentation date and time information 113N.

The account ID 113A is identification information for identifying an account given to a member of the printer use service. For example, when the user Uz performs a membership registration of the printer use service, the account ID 113A is automatically assigned to the account given to the user Uz.

The password 113B is authentication information for authenticating the account. For example, when the user Uz performs a membership registration of the printer use service, the password 113B is set by the user Uz.

The delivery destination information 113C is information indicating the delivery destination of the delivery item. In the first printer use service, the delivery destination information 113C indicates the delivery destination of the ink consumed by the first printer 3A. In the second printer use service, the delivery destination information 113C indicates the delivery destination of the second printer 3B and the ink consumed by the second printer 3B. For example, the delivery destination information 113C is set by the user Uz when the user Uz performs a membership registration of the printer use service. The delivery destination information 113C can be changed even after it is stored in the account management database 113, that is, even after the membership registration of the printer use service is performed.

The service information 113D is information indicating either the first printer use service or the second printer use service. For example, the service information 113D is set by the user Uz when the user Uz performs a membership registration of the printer use service.

The fee plan information 113E is information indicating a fee plan. When the associated service information 113D in the same record indicates the first printer use service, the fee plan information 113E indicates any one of the first service fee plan, the second service fee plan, and the third service fee plan. When the associated service information 113D in the same record indicates the second printer use service, the fee plan information 113E indicates any one of the fourth service fee plan, the fifth service fee plan, and the sixth service fee plan.

The serial number 113F is an identification number that identifies the service printer 3.

The payment method information 113G is information indicating how to pay the usage fee of the printer use service. For example, when the payment method information 113G indicates a payment method using a credit card is indicated, the payment method information 113G includes a combination of information indicating that the payment is made by a credit card and a credit card number. For example, the payment method information 113G is set by the user Uz when the user Uz performs a membership registration of the printer use service. As in the delivery destination information 113C, the payment method information 113G can be changed even after performing a membership registration of the printer use service.

The payment date information 113H is information indicating the payment date of the usage fee of the printer use service. Since the printer use service is a subscription-type service, the payment date indicated by the payment date information 113H is indicated in a form of, for example, on which day of every month the payment is to be made. For example, the payment date information 113H indicates the payment date in the form of on which day of every month the payment is to be made with a day when the use of the service printer 3 is started as a starting point.

The payment status information 113I is information indicating the payment status of the usage fee of the printer use service. The payment status information 113I indicates either paid or unpaid. On the payment date indicated by the payment date information 113H, the providing server controller 10 makes an inquiry of the main entity acting on behalf of paying the usage fee, acquires the payment status from the main entity, and updates the payment status information 113I as appropriate.

The use period information 113J is information indicating the total use period of the printer use service. The use period information 113J is appropriately updated by the providing server controller 10. For example, on the payment date indicated by the payment date information 113H, the providing server controller 10 makes an inquiry of the main entity acting on behalf of paying the usage fee, and acquires the payment status from the main entity. When the acquired payment status is paid, the providing server controller 10 updates the use period indicated by the use period information 113J to a use period obtained by adding a period for one month. Further, for example, the providing server controller 10 updates the use period indicated by the use period information 113J to a use period obtained by adding a period for one day from day to day.

The average printed sheet number information 113K indicates the average number of printed sheets which is the average of the number of printed sheets per given period defined by the fee plan. As described above, for the fee plan, a fee plan with one month as the given period is exemplified. Therefore, in the present embodiment, the average printed sheet number information 113K indicates the average number of printed sheets per month. The average printed sheet number information 113K is updated on the payment date of each month. On the payment date indicated by the payment date information 113H, the providing server controller 10 makes an inquiry of the main entity acting on behalf of paying the usage fee, and acquires the payment status from the main entity. When the acquired payment status is paid, the providing server controller 10 calculates, based on the information indicating the number of printed sheets transmitted from the printer to the service providing server 1, the average number of printed sheets, and updates the average number of printed sheets indicated by the average printed sheet number information 113K to the calculated average number of printed sheets.

The delivery count information 113L is information indicating the number of times the ink consumed by the service printer 3 is delivered to the delivery destination indicated by the delivery destination information 113C. The providing server controller 10 updates the delivery count information 113L by incrementing the delivery count indicated by the delivery count information 113L by one each time a delivery request is made to the delivery server 2.

The presentation count information 113M is information indicating the number of times the alternative fee plan is presented to the user Uz. The alternative fee plan will be described later. The alternative fee plan corresponds to an example of a second fee plan. The providing server controller 10 updates the presentation count information 113M by incrementing the number of times indicated by the presentation count information 113M by one each time the alternative fee plan information indicating the alternative fee plan is transmitted to the terminal device 4. The alternative fee plan information corresponds to an example of second fee plan information.

The previous presentation date and time information 113N is information indicating the date and time when the alternative fee plan was presented to the user Uz last time. Each time the providing server controller 10 updates the date and time indicated by the previous presentation date and time information 113N as the date and time when the transmission date and time was presented each time the alternative fee plan information is transmitted to the terminal device 4.

Next, the printer management database 114 will be described. The printer management database 114 is a database that manages the service printer 3.

FIG. 4 is a diagram schematically showing information included in one record of the printer management database 114. As shown in FIG. 4, one record of the printer management database 114 includes the serial number 113F, ink amount information 114A, total printed sheet number information 114B, and a log file 114C.

The ink amount information 114A is information indicating the remaining amount of ink of the delivered ink cartridge 321A when the service printer 3 indicated by the associated serial number 113F is the first printer 3A. On the other hand, the ink amount information 114A is information indicating the total amount of ink used after the second printer 3B is delivered when the service printer 3 indicated by the associated serial number 113F is the second printer 3B. In the following description, the total amount of ink used after the second printer 3B is delivered is referred to as a "total use amount of ink". The remaining amount of ink or the total use amount of ink indicated by the ink amount information 114A is appropriately updated by the providing server controller 10.

The total printed sheet number information 114B is information indicating the total number of print media on which the service printer 3 performs printing during a given period defined by the fee plan. As described above, for the fee plan, a fee plan with one month as the given period is exemplified. Therefore, in the present embodiment, the total printed sheet number information 114B is information indicating the total number of print media on which the service printer 3 performs printing for one month. The total printed sheet number information 114B is updated as appropriate by the providing server controller 10. Further, the total number of print media indicated by the total printed sheet number information 114B is reset to zero when the usage fee is paid on the payment date indicated by the payment date information 113H.

The log file 114C is a file in which log information is described. The log information is a log of a plurality of monitoring items. The monitoring item is an item which is predetermined to monitor the status of the service printer 3 and to make a log. For example, there is a monitoring item of a printer error, as the monitoring item. As a log of the monitoring item of a log of the printer error, information indicating that the printer error has occurred is recorded in time series together with information indicating the date and time in the log file 114C. The printer error refers to a status in which normal printing cannot be performed, such as a state of abnormality of the ink jet head.

Returning to the description of FIG. 2, the service providing server 1 includes a providing server communication unit 11. The providing server communication unit 11 corresponds to an example of the communication unit. The providing server communication unit 11 includes communication hardware according to a predetermined communication standard, and under the control of the providing server controller 10, communicates with devices connected to the global network GN according to the predetermined communication standard. The devices connected to the global network GN here include the service printer 3, the terminal device 4, and the delivery server 2.

Next, the functional configurations of the first printer 3A, the second printer 3B, and the terminal device 4 will be described. Since the terminal devices 4A and 4B have the same configuration, the terminal device 4A will be described as a representative, and the description and illustration of the terminal device 4B will be omitted.

The first printer 3A includes a first printer controller 30A. The first printer controller 30A includes a processor 300A that executes programs such as a CPU and an MPU, and a first printer storage unit 310A, and controls respective units of the first printer 3A. The first printer controller 30A performs various processes in cooperation with hardware and software so that the processor 300A reads a control program 311A stored in the first printer storage unit 310A and executes the processes.

The first printer storage unit 310A has a storage area in which a program executed by the processor 300A and data processed by the processor 300A is stored. The first printer storage unit 310A stores the control program 311A executed by the processor 300A and setting data 312A including various setting values related to the operation of the first printer 3A. The first printer storage unit 310A has a nonvolatile storage area in which programs and data are stored in a nonvolatile manner. Further, the first printer storage unit 310A may include a volatile storage area and may be configured to temporarily store a program executed by the processor 300A and data to be processed.

The first printer storage unit 310A stores the serial number 113F, printed sheet number information 313A, and the log file 114C in addition to the control program 311A and the setting data 312A.

The printed sheet number information 313A indicates the number of print media on which the service printer 3 performs printing. The printer information will be described later. When the first printer controller 30A transmits the printer information to the service providing server 1, the first printer controller 30A resets the number of printed sheets indicated by the printed sheet number information 313A to zero. In addition, the first printer controller 30A cumulatively counts the number of printed sheets each time printing is performed to update the printed sheet number information 313A stored in the first printer storage unit 310A to the printed sheet number information 313A indicating the number of printed sheets after counting.

As described above, the log file 114C is a file in which log information is described. The first printer controller 30A monitors whether a printer error has occurred, and records the log of the monitoring item, that is, the log of the printer error, in the log file 114C based on the monitoring result.

The first printer 3A includes a first printer communication unit 31A. The first printer communication unit 31A is composed of communication hardware according to a predetermined communication standard, and under the control of the first printer controller 30A, communicates with devices connected to the local network LN1 and the global network GN according to the predetermined communication standard. In the present embodiment, the device connected to the local network LN1 with which the first printer communication unit 31A communicates is the terminal device 4A. Further, in the present embodiment, the device connected to the global network GN with which the first printer communication unit 31A communicates is the service providing server 1.

The first printer 3A includes a first printer printing unit 32A. The first printer printing unit 32A has a configuration related to a printing system including an ink jet head that forms dots by ejecting the ink on a print medium, a carriage for operating the ink jet head in the scanning direction, a carriage drive motor for driving the carriage, a transport unit that transports a print medium, the ink cartridge 321A for supplying the ink to the ink jet head, and the like. The first printer printing unit 32A prints an image on a print medium under the control of the first printer controller 30A. An IC chip is mounted on the ink cartridge 321A. The first printer controller 30A writes ink remaining amount information 322A indicating the remaining amount of ink of the ink cartridge 321A to the IC chip of the ink cartridge 321A each time printing is performed.

The terminal device 4A includes a terminal controller 40. The terminal controller 40 includes a processor 400 that executes programs such as a CPU and an MPU, and a terminal storage unit 410, and controls respective units of the terminal device 4A. The terminal controller 40 executes various processes by cooperation of hardware and software so that the processor 400 reads a control program 411 stored in the terminal storage unit 410 and executes the process.

A printer driver 413 is installed in the terminal device 4A at predetermined timing. The terminal controller 40 functions as a driver execution unit 401 by the processor 400 reading and executing the printer driver 413. In addition, a dedicated application 414, which is a dedicated application program for using the printer use service, is installed in the terminal device 4A. The terminal controller 40 functions as a dedicated application execution unit 402 by the processor 400 reading and executing the dedicated application 414. Functions of the driver execution unit 401 and the dedicated application execution unit 402 will be described later.

The terminal storage unit 410 has a storage area in which a program executed by the processor 400 and data processed by the processor 400 is stored. The terminal storage unit 410 stores the control program 411 executed by the processor 400, setting data 412 including various setting values related to the operation of the terminal device 4A, the printer driver 413, the dedicated application 414, and various pieces of data. The terminal storage unit 410 has a nonvolatile storage area in which programs and data are stored in a nonvolatile manner. Further, the terminal storage unit 410 may have a volatile storage area and may be configured to temporarily store a program executed by the processor 400 and data to be processed.

The terminal device 4A includes a terminal communication unit 41. The terminal communication unit 41 includes communication hardware according to a predetermined communication standard, and under the control of the terminal controller 40, communicates with devices connected to the local network LN and the global network GN according to the predetermined communication standard. In the present embodiment, the device connected to the local network LN with which the terminal communication unit 41 communicates is the service printer 3. In the terminal device 4A, the terminal communication unit 41 communicates with the first printer 3A connected to the local network LN1. In the terminal device 4B, the terminal communication unit 41 communicates with the second printer 3B connected to the local network LN2. Further, in the present embodiment, the device connected to the global network GN with which the terminal communication unit 41 communicates is the service providing server 1.

The terminal device 4A includes a terminal display unit 42. The terminal display unit 42 includes a display panel, and displays various pieces of information on the display panel under the control of the terminal controller 40.

The terminal device 4A includes a terminal input unit 43. The terminal input unit 43 includes a keyboard, a mouse, and another input section, and detects a user operation on the input section to output the detected operation to the terminal controller 40. The terminal controller 40 executes a process corresponding to the user operation on the input section based on the input from the terminal input unit 43.

As described above, the terminal controller 40 functions as the driver execution unit 401 and the dedicated application execution unit 402.

The driver execution unit 401 generates, based on the image data generated by the predetermined application program, print data for causing the service printer 3 to print the image indicated by the image data. The print data includes various control commands corresponding to the command system of the service printer 3. The driver execution unit 401 transmits the generated print data to the service printer 3 through the terminal communication unit 41. In the terminal device 4A, the driver execution unit 401 transmits print data corresponding to the command system of the first printer 3A to the first printer 3A. In the terminal device 4B, the driver execution unit 401 transmits print data corresponding to the command system of the second printer 3B to the second printer 3B.

The dedicated application execution unit 402 executes the process related to a membership registration of the printer use service, a change in membership registration, and a request for withdrawal from the printer use service.

The dedicated application execution unit 402 displays, on the terminal display unit 42, a user interface for performing a membership registration of the printer use service, that is, a user interface for performing joining to the printer use service. In the following description, this user interface is referred to as a "membership registration UI". At least the password 113B, the delivery destination information 113C, the service information 113D, the fee plan information 113E, and the payment method information 113G can be input to the membership registration UI. The dedicated application execution unit 402 transmits various pieces of information input to the membership registration UI to the service providing server 1 through the terminal communication unit 41. The service providing server 1 stores a record including various received information in the account management database 113 to perform a membership registration.

Further, the dedicated application execution unit 402 displays, on the terminal display unit 42, a user interface for changing the membership registration of the printer use service. Changing the membership registration of the printer use service means changing the contents of the record stored in the account management database 113. When changing the membership registration, for example, the delivery destination information 113C and the payment method information 113G can be changed. The account ID 113A, the password 113B, and the information to be changed can be input to the user interface. The dedicated application execution unit 402 transmits various pieces of information input to the user interface to the service providing server 1 through the terminal communication unit 41. The service providing server 1 updates the information included in the records stored in the account management database 113 based on the received various pieces of information.

The dedicated application execution unit 402 displays, on the terminal display unit 42, a user interface for making a request for withdrawal from the printer use service. In the following description, this user interface is referred to as a "request-for-withdrawal UI". The dedicated application execution unit 402 receives the withdrawal request by the user Uz by displaying the request-for-withdrawal UI on the terminal display unit 42. Various pieces of information can be input to the request-for-withdrawal UI. The dedicated application execution unit 402 transmits various pieces of information input to the request-for-withdrawal UI to the service providing server 1 through the terminal communication unit 41.

The second printer 3B includes a second printer controller 30B. The second printer controller 30B includes a processor 300B that executes programs such as a CPU and an MPU, and a second printer storage unit 310B, and controls respective units of the second printer 3B. The second printer controller 30B performs various processes in cooperation with hardware and software so that the processor 300B reads a control program 311B stored in the second printer storage unit 310B and executes the processes. In the following description, when the first printer controller 30A and the second printer controller 30B are collectively referred to without distinction, they each are referred to as a "printer controller" and will be denoted by the symbol "30".

The second printer storage unit 310B has a storage area in which a program executed by the processor 300B and data processed by the processor 300B is stored. The second printer storage unit 310B stores the control program 311B executed by the processor 300B and setting data 312B including various setting values related to the operation of the second printer 3B. The second printer storage unit 310B has a nonvolatile storage area in which programs and data are stored in a nonvolatile manner. Further, the second printer storage unit 310B may include a volatile storage area and may be configured to temporarily store a program executed by the processor 300B and data to be processed.

The second printer storage unit 310B stores the serial number 113F, total ink use amount information 313B, printed sheet number information 313A, and the log file 114C in addition to the control program 311B and the setting data 312B.

The total ink use amount information 313B is information indicating the total amount of ink used by the second printer 3B after the second printer 3B is delivered. The second printer controller 30B adds the amount of ink used for printing to the total use amount of ink indicated by the total ink use amount information 313B stored in the second printer storage unit 310B each time printing is performed to calculate the total use amount of ink at the end of printing. Then, the second printer controller 30B updates the total use amount of ink indicated by the total ink use amount information 313B stored in the second printer storage unit 310B to the calculated total use amount of ink.

When the second printer controller 30B transmits the printer information to the service providing server 1, the second printer controller 30B resets the number of printed sheets indicated by the printed sheet number information 313A to zero. In addition, the second printer controller 30B cumulatively counts the number of printed sheets each time printing is performed until the printer information is transmitted to update the number of printed sheets indicated by the printed sheet number information 313A stored in the second printer storage unit 310B to the number of printed sheets after counting.

The second printer controller 30B monitors whether a printer error has occurred, and records the log of the monitoring item, that is, the log of the printer error, in the log file 114C based on the monitoring result.

The second printer 3B includes a second printer communication unit 31B. The second printer communication unit 31B is composed of communication hardware according to a predetermined communication standard, and under the control of the second printer controller 30B, communicates with devices connected to the local network LN2 and the global network GN according to the predetermined communication standard. In the present embodiment, the device connected to the local network LN2 with which the second printer communication unit 31B communicates is the terminal device 4B. Further, in the present embodiment, the device connected to the global network GN with which the second printer communication unit 31B communicates is the service providing server 1. In the following description, when the first printer communication unit 31A and the second printer communication unit 31B are collectively referred to without distinction, they each are referred to as a "printer communication unit" and will be denoted by the symbol "31".

The second printer 3B includes a second printer printing unit 32B. The second printer printing unit 32B has a configuration related to a printing system including an ink jet head that forms dots by ejecting the ink on a print medium, a carriage for operating the ink jet head in the scanning direction, a carriage drive motor for driving the carriage, a transport unit that transports a print medium, the ink tank 321B for supplying the ink to the ink jet head, and the like. The second printer printing unit 32B prints an image on a print medium under the control of the second printer controller 30B.

Here, operations of the service printer 3 and the service providing server 1 in the printer use service will be described.

A printer controller 30 determines whether a trigger for transmitting printer information has occurred. Examples of the trigger include occurrences that the power is turned on, that a predetermined period has elapsed, that printing has ended, and the like.

The printer information is information about the service printer 3. In the first printer 3A, the printer information includes the serial number 113F, the printed sheet number information 313A, and the log file 114C which are stored in the first printer storage unit 310A, and the ink remaining amount information 322A recorded in an IC chip of the ink cartridge 321A. In the second printer 3B, the printer information includes the serial number 113F, total ink use amount information 313B, the printed sheet number information 313A, and the log file 114C which are stored in the second printer storage unit 310B.

When determining that a trigger has occurred, the printer controller 30 transmits printer information to the service providing server 1 through the printer communication unit 31.

Upon receiving the printer information, the providing server controller 10 of the service providing server 1 determines, based on the ink remaining amount information 322A or the total ink use amount information 313B included in the printer information, whether the ink is required to deliver. When determining that the ink is required to deliver, the providing server controller 10 makes a delivery request to the delivery server 2 to cause the main entity that owns the delivery server 2 to deliver the ink.

In addition, the providing server controller 10 updates the record of the printer management database 114 based on the received printer information. That is, the providing server controller 10 updates the ink amount information 114A included in the record to the ink remaining amount information 322A or the total ink use amount information 313B included in the received printer information. The providing server controller 10 adds the number of printed sheets indicated by the printed sheet number information 313A included in the received printer information to the total number of printed sheets indicated by the total printed sheet number information 114B included in the record to update the total printed sheet number information 114B included in the record. The providing server controller 10 updates the log file 114C included in the record to the log file 114C included in the received printer information.

Next, with reference to FIG. 6, operations of the terminal device 4 and the service providing server 1 relating to the withdrawal from the printer use service will be described.

Figure 6:
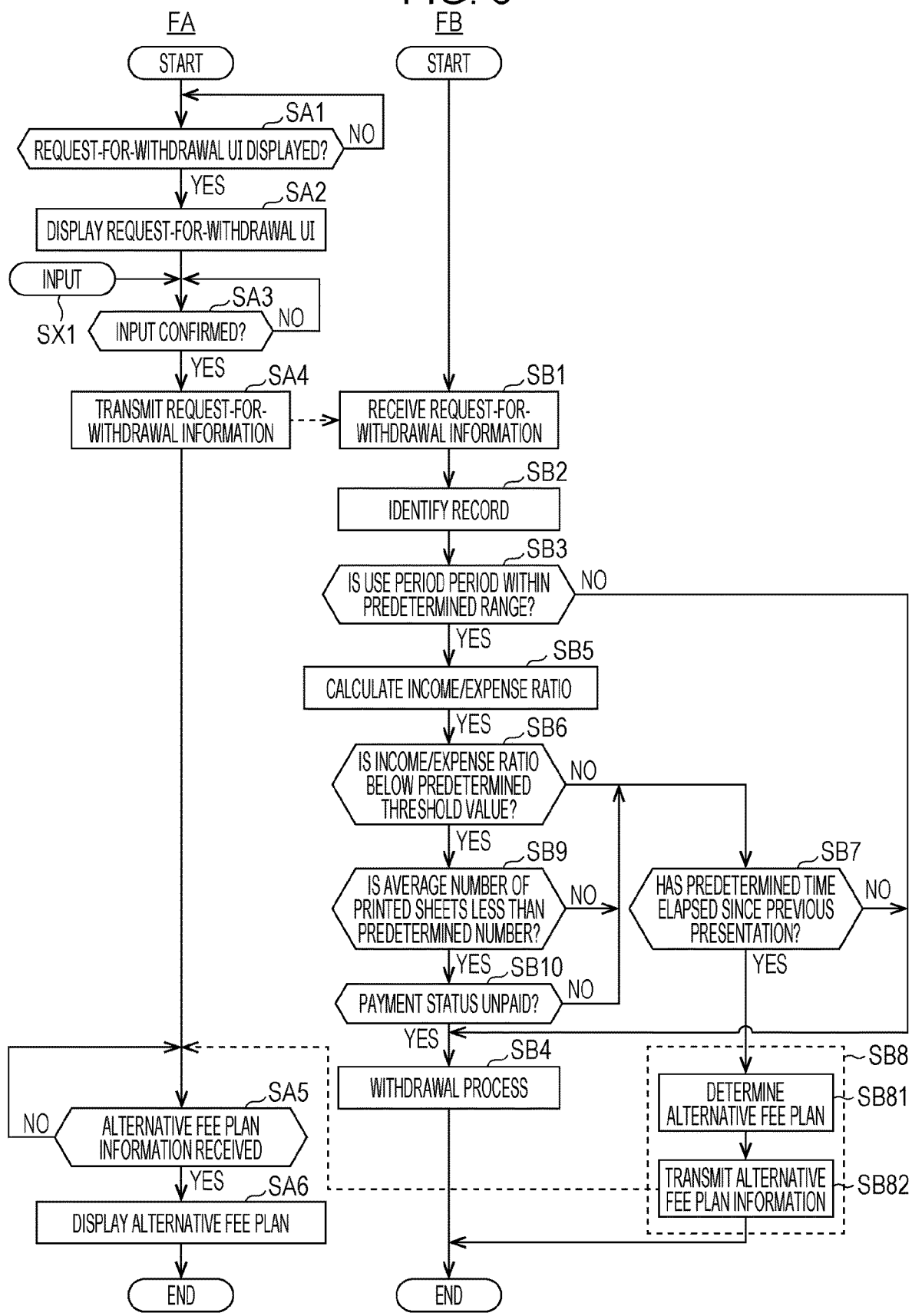
FIG. 6 is a flowchart showing operations of the terminal device and the service providing server.

FIG. 6 is a flowchart showing the operations of the terminal device 4 and the service providing server 1. In FIG. 6, a flowchart FA shows the operation of the terminal device 4, and a flowchart FB shows the operation of the service providing server 1.

With reference to the flowchart FA, the dedicated application execution unit 402 of the terminal controller 40 of the terminal device 4 determines whether to display the request-for-withdrawal UI on the terminal display unit 42 (step SA1). For example, when the terminal input unit 43 detects an operation of instructing the display of the request-for-withdrawal UI, the dedicated application execution unit 402 makes the affirmative determination in step SA1.

When determining that the request-for-withdrawal UI is displayed (step SA1: YES), the dedicated application execution unit 402 displays the request-for-withdrawal UI on the terminal display unit 42 (step SA2).

When the request-for-withdrawal UI is displayed, the user Uz inputs various pieces of information to the request-for-withdrawal UI (step SX1). The information that the user Uz inputs to the request-for-withdrawal UI is at least the account ID 113A and the password 113B set for the account.

The dedicated application execution unit 402 determines whether the input to the request-for-withdrawal UI is confirmed (step SA3). The request-for-withdrawal UI is provided with a confirm button for confirming the input, and when the confirm button is operated, the dedicated application execution unit 402 makes the affirmative determination in step SA3.

When determining that the input to the request-for-withdrawal UI is confirmed (step SA3: YES), the dedicated application execution unit 402 transmits the request-for-withdrawal information indicating the request for withdrawal from the printer use service to the service providing server 1 through the terminal communication unit 41 (step SA4). The request-for-withdrawal information includes various pieces of information input in the request-for-withdrawal UI.

Referring to the flowchart FB, the providing server controller 10 of the service providing server 1 receives the request-for-withdrawal information through the providing server communication unit 11 (step SB1).

Next, the providing server controller 10 identifies, from the account management database 113, a record having the account ID 113A that matches the account ID 113A included in the received request-for-withdrawal information (step SB2).

Next, the providing server controller 10 determines whether the use period indicated by the use period information 113J included in the identified record is within a predetermined range (step SB3). The predetermined range serving as the determination criterion in step SB3 varies depending on the fee plan. The predetermined range serving as the determination criterion in step SB3 may vary depending on the country or region where the service printer 3 is used. The predetermined range serving as the determination criterion in step SB3 is appropriately determined in advance by a test, a simulation or the like based on the viewpoint of preventing unnecessary presentation of the alternative fee plan.

In step SB3, the providing server controller 10 determines a predetermined range corresponding to the fee plan indicated by the fee plan information 113E included in the record identified in step SB2. Then, in step SB3, the providing server controller 10 determines whether the use period indicated by the use period information 113J is within the determined predetermined range.

When determining that the use period indicated by the use period information 113J is not a period within the predetermined range (step SB3: NO), the providing server controller 10 executes the withdrawal process (step SB4). That is, when the use period indicated by the use period information 113J has not reached the shortest period in the predetermined range, or when it exceeds the longest period in the predetermined range, the providing server controller 10 executes withdrawal process. The withdrawal process will be described later.

On the other hand, when determining that the use period indicated by the use period information 113J is within the predetermined range (step SB3: YES), the providing server controller 10 calculates an income/expense ratio (step SB5).

The income/expense ratio indicates a ratio between the income that is earned by the main entity that runs the printer use service and that is generated when the user Uz uses the printer use service, and the expense the main entity spends.

The providing server controller 10 calculates the income earned by the main entity that runs the printer use service based on the use period indicated by the use period information 113J included in the record identified in step SB2 and the usage fee that is indicated by the fee plan information 113E included in the record identified in step SB2 and that is defined by the fee plan. When the fee plan was changed once or a plurality of times in the past, the providing server controller 10 calculates the income taking into account the usage fee defined by the fee plan before the change and the use period of the printer use service based on the fee plan before the change. Also, the providing server controller 10 calculates the expense the main entity that provides the printer use service spends based on the delivery count indicated by the delivery count information 113L included in the record identified in step SB2 and the cost of delivery. The cost of delivery is predetermined. Then, the providing server controller 10 divides the calculated income by the calculated expense to calculate the income/expense ratio. Note that the method of calculating the income and the expense is an example and is not limited to the method described above.

After calculating the income/expense ratio, the providing server controller 10 determines whether the calculated income/expense ratio is lower than a predetermined threshold value (step SB6). The predetermined threshold value serving as the determination criterion in step SB6 varies depending on the fee plan. This predetermined threshold value may vary depending on the country or region where the service printer 3 is used. The predetermined threshold value serving as the determination criterion in step SB6 is properly determined in advance by a test or a simulation based on the viewpoint that the main entity that runs the printer use service is not disadvantaged.

In step SB6, the providing server controller 10 determines a predetermined threshold value corresponding to the fee plan indicated by the fee plan information 113E included in the record identified in step SB2. Then, in step SB6, the providing server controller 10 determines whether the calculated income/expense ratio is equal to or less than the determined predetermined threshold value.

When determining that the calculated income/expense ratio is equal to or greater than the predetermined threshold value (step SB6: NO), the providing server controller 10 determines whether the predetermined time or more has elapsed since the alternative fee plan was presented last time (step SB7). This predetermined time varies depending on the fee plan. The predetermined time may vary depending on the country or region where the service printer 3 is used. The predetermined time serving as the determination criterion in step SB7 is appropriately determined in advance by a test, a simulation or the like based on the viewpoint of preventing unnecessary presentation of the alternative fee plan.

In step SB7, the providing server controller 10 determines a predetermined time corresponding to the fee plan indicated by the fee plan information 113E included in the record identified in step SB2. In step SB7, the providing server controller 10 determines whether the time from the presentation date and time indicated by the previous presentation date and time information 113N included in the record identified in step SB2 to the current time is equal to or longer than the determined predetermined time.

When determining that the predetermined time or more has not elapsed since the fee plan was presented last time (step SB7: NO), the providing server controller 10 executes the withdrawal process (step SB4).

On the other hand, when determining that the predetermined time or more has elapsed since the alternative fee plan was presented last time (step SB7: YES), the providing server controller 10 executes the alternative fee plan transmission process (step SB8). The alternative fee plan transmission process will be described later.

Returning to the description of step SB6, when determining that the calculated income/expense ratio is less than the predetermined threshold value (step SB6: YES), the providing server controller 10 determines whether the average number of printed sheets is less than the predetermined number of sheets (step SB9). The predetermined number of sheets varies depending on the fee plan of the printer use service. The predetermined number of sheets may vary depending on the country or region where the service printer 3 is used. The predetermined number of sheets serving as the determination criterion in step SB9 is appropriately determined in advance by a test, a simulation, or the like based on the viewpoint of preventing unnecessary presentation of the alternative fee plan.

In step SB9, the providing server controller 10 determines the predetermined number of sheets corresponding to the fee plan indicated by the fee plan information 113E included in the record identified in step SB2. In step SB9, the providing server controller 10 determines whether the average number of printed sheets indicated by the average printed sheet number information 113K included in the record identified in step SB2 is less than the determined predetermined number of sheets.

When determining that the average number of printed sheets is equal to or greater than the predetermined number of sheets (step SB9: NO), the providing server controller 10 executes the process of step SB7, and when making the negative determination in step SB7, it executes the withdrawal process, and when making the affirmative determination in step SB7, it executes the alternative fee plan transmission process.

On the other hand, when determining that the average number of printed sheets is less than the predetermined number of sheets (step SB9: YES), the providing server controller 10 determines whether the payment status is unpaid (step SB10).

In step SB10, the providing server controller 10 determines whether the payment status information 113I included in the record identified in step SB2 indicates unpaid or paid.

When determining that the payment status indicates paid (step SB10: NO), that is, in step SB10, when determining that the payment status information 113I included in the record identified in step SB2 indicates paid, the providing server controller 10 executes the process of step SB7. Then, the providing server controller 10 executes the alternative fee plan transmission process when making the affirmative determination in step SB7, and executes the withdrawal process when making the negative determination in step SB7.

Here, the alternative plan transmission process will be described. The alternative plan transmission process is a process of transmitting the alternative fee plan information indicating the alternative fee plan to the terminal device 4.

The alternative fee plan is a fee plan that can replace the fee plan selected by the user Uz when the request-for-withdrawal information is received. In the following description, the fee plan selected by the user Uz when the request-for-withdrawal information is received is referred to as a "selected fee plan". The selected fee plan corresponds to an example of a first fee plan. The alternative fee plan is different from the selected fee plan, and is different from the fee plan selected by the user Uz when the user Uz joins the printer use service.

The providing server controller 10 determines the alternative fee plan in the alternative fee plan transmission process (step SB81). Here, a plurality of processes of step SB81 will be described. The providing server controller 10 may determine the alternative fee plan by any one of a plurality of processes described below, or may determine the alternative fee plan by combining a plurality of any processes.

Process 1

The providing server controller 10 determines, as the alternative fee plan, all fee plans different from the selected fee plan among the fee plans set for respective printer use services. For example, when the user Uz1 has selected the first service fee plan from the time of performing a membership registration, the providing server controller 10 determines the second service fee plan and the third service fee plan as the alternative fee plan. Further, for example, when the user Uz2 has selected the fourth service fee plan from the time of performing a membership registration, the providing server controller 10 determines the fifth service fee plan and the sixth service fee plan as the alternative fee plan.

Process 2

The providing server controller 10 determines, based on the average number of printed sheets, one fee plan different from the selected fee plan as the alternative fee plan among the fee plans set for respective printer use services. For example, it is assumed that the user Uz has selected the first service fee plan from the time of performing a membership registration and the average number of printed sheets is Y (Y3<Y<Y2). In this case, the providing server controller 10 determines, as the alternative fee plan, the second service fee plan that allows printing without charge for Y or more sheets of the second service fee plan and the third service fee plan. Further, for example, it is assumed that the user Uz2 has selected the fourth service fee plan from the time of performing a membership registration of and the average number of printed sheets is Y (Y<Y6). In this case, the providing server controller 10 determines, as the alternative fee plan, the sixth service fee plan that allows printing without charge for 100 or more sheets and that has the lowest monthly usage fee of the fifth service fee plan and the sixth service fee plan.

Process 3

The providing server controller 10 creates a fee plan in which the number of printable sheets defined in the selected fee plan is increased based on the average number of printed sheets, and determines the created fee plan as the alternative fee plan. For example, it is assumed that the user Uz1 has selected the first service fee plan and the average number of printed sheets is Y (Y>Y1). In this case, the providing server controller 10 creates a new fee plan in which the fee is the same as the fee defined in the first service fee plan and the number of printable sheets is defined to be 150. Then, the providing server controller 10 determines the new fee plan as the alternative fee plan.

Process 4

The providing server controller 10 creates a fee plan in which the fee defined in the selected fee plan is decreased, and determines the created fee plan as the alternative fee plan. For example, it is assumed that the user Uz1 has selected the first service fee plan. In this case, the providing server controller 10 creates a new fee plan in which the number of printable sheets is the number of printable sheets defined in the first service fee plan and the fee is lower than that of the first service fee plan. Then, the providing server controller 10 determines the new fee plan as the alternative fee plan.

Process 5

The providing server controller 10 creates a new fee plan that allows printing without charge for the number of printable sheets defined by the selected fee plan for a given period such as several months, and determines the created fee plan as the alternative fee plan.

Returning to the description of the flowchart FB, the providing server controller 10 transmit the alternative fee plan information indicating the alternative fee plan determined in step SB81 to the terminal device 4 through the providing server communication unit 11 (step SB82).

With reference to the flowchart FA, the terminal controller 40 of the terminal device 4 determines whether the terminal communication unit 41 receives the alternative fee plan information (step SA5).

When determining that the terminal communication unit 41 has received the alternative fee plan information (step SA5), the terminal controller 40 displays the received alternative fee plan information on the terminal display unit 42 (step SA6). As a result, the terminal device 4 presents the alternative fee plan to the user Uz. Note that the presentation method is not limited to by display but may be by sound.

Returning to the description of the flowchart FB, when determining that the payment status indicates unpaid (step SB10: YES), that is, in step SB10, when determining that the payment status information 113I included in the record identified in step SB2 indicates unpaid, the providing server controller 10 executes the withdrawal process.

In the withdrawal process, the providing server controller 10 deletes, from the account management database 113, the record having the account ID 113A that matches the account ID 113A included in the request-for-withdrawal information received in step SB1. Then, when the deletion of the record is completed in the withdrawal process, the providing server controller 10 transmits, to the terminal device 4, information indicating that the withdrawal is completed. Further, in the withdrawal process, the providing server controller 10 restricts the function that can be executed by the service printer 3 having the serial number 113F included in the request-for-withdrawal information received in step SB1. When the service printer 3 indicated by the serial number 113F is the first printer 3A, the providing server controller 10 transmits, to the first printer 3A, information instructing that printing using the delivered ink cartridge 321A cannot be performed. In addition, when the service printer 3 indicated by the serial number 113F is the second printer 3B the providing server controller 10 transmits for example, the information instructing not to execute functions other than display and communication to the second printer 3B.

Next, a modification of the present embodiment will be described.

Modification

In the modification, the process of step SB7 of the flowchart FB shown in FIG. 6 is different from that of the above-described embodiment. In the modification, in step SB7, the providing server controller 10 determines whether the number of times the alternative fee plan has been presented in the past is equal to or greater than a predetermined number. This predetermined number of times indicates a plurality of times, and the number of times varies depending on the fee plan. The predetermined number of times may vary depending on the country or region where the service printer 3 is used. The predetermined number of times is appropriately determined in advance by a test, a simulation, or the like based on the viewpoint of preventing unnecessary presentation of the alternative fee plan.

In step SB7, the providing server controller 10 determines whether the number of times of presentation indicated by the presentation count information 113M included in the record identified in step SB2 is equal to or greater than the predetermined number.

When determining that the number of times the alternative fee plan was presented in the past is less than the predetermined number (step SB7: NO), the providing server controller 10 executes the withdrawal process (step SB4). On the other hand, when determining that the number of times the alternative fee plan was presented in the past is equal to or greater than the predetermined number of times (step SB7: YES), the providing server controller 10 executes the alternative fee plan transmission process (step SB8).

As described above, the service providing system 1000 includes the service providing server 1 that provides the printer use service, and the terminal device 4 configured to communicate with the service providing server 1. The terminal device 4 accepts a request by the user for withdrawal from the printer use service, and transmits, to the service providing server 1, the request-for-withdrawal information indicating the accepted request for withdrawal. When receiving the request-for-withdrawal information from the terminal device 4, the service providing server 1 determines the alternative fee plan based on the form of use by the user Uz of the printer use services to transmit the alternative fee plan information indicating the determined alternative fee plan to the terminal device 4. The terminal device 4 presents, to the user Uz, the alternative fee plan indicated by the alternative fee plan information received from the service providing server 1.

Further, in the control method of the service providing system 1000, the terminal device 4 accepts a request by the user for withdrawal from the printer use service to transmit request-for-withdrawal information indicating the accepted request for withdrawal to the service providing server 1. In the control method, when receiving the request-for-withdrawal information from the terminal device 4, the service providing server 1 determines the alternative fee plan based on the form of use by the user Uz of the printer use services to transmit the alternative fee plan information indicating the determined alternative fee plan to the terminal device 4. In the control method, the terminal device 4 presents, to the user Uz, the alternative fee plan indicated by the alternative fee plan information received from the service providing server 1.

The service providing server 1 includes the providing server communication unit 11 that receives the request-for-withdrawal information from the terminal device 4, and the providing server controller 10 that determine the alternative fee plan different from the selected fee plan based on the form of use by the user Uz of the printer use service when receiving the request-for-withdrawal information from the terminal device 4 to transmit the alternative fee plan information indicating the determined alternative fee plan to the terminal device 4 through the providing server communication unit 11.

According to the service providing system 1000, the control method of the service providing system 1000, and the service providing server 1, when the user Uz attempts to withdraw from the printer use service, it is possible to present to the user Uz the alternative fee plan suitable for the form of use by the user Uz. Therefore, the user Uz can be aware of the alternative fee plan suitable for the form of use by the user Uz when the user Uz attempts to withdraw from the printer use service.

The service providing server 1 receives the printed sheet number information 313A indicating the number of sheets on which printing is performed by the service printer 3 to determine the alternative fee plan based on the printed sheet number information 313A.

According to this, it is possible to present, to the user Uz, the alternative fee plan according to the number of sheets on which printing is performed by the service printer 3. Therefore, the user Uz can be aware of the alternative fee plan suitable for the form of use of the service printer 3 when attempting to withdraw from the printer use service.

The service providing server 1 creates a new fee plan based on the printed sheet number information 313A and the selected fee plan, and uses the created fee plan as the alternative fee plan.

According to this, it is possible to present, to the user Uz, a new alternative fee plan according to the number of sheets on which printing is performed by the service printer 3. Therefore, when attempting to withdraw from the printer use service, the user Uz can be aware of the alternative fee plan that is attractive to the user Uz.

The service providing server 1 determines whether to transmit the alternative fee plan information to the terminal device 4 based on the form of use by the user Uz of the printer use service. When it is determined that the alternative plan information is transmitted, the service providing server 1 transmits the alternative fee plan information to the terminal device 4, and when it is determined that the alternative fee plan information is not transmitted, the service providing server 1 does not transmit the alternative fee plan information to the terminal device 4.

According to this since presence or absence of presentation of the alternative fee plan by the terminal device 4 can be determined based on the form of use by the user Uz of the printer use service, it is possible to present, to the user Uz, the alternative fee plan suitable for the form of use by the user Uz while preventing unnecessary presentation of the alternative fee plan.

When the period of use by the user Uz of the printer use service is within the predetermined range, the service providing server 1 determines that the alternative fee plan information is transmitted to the terminal device 4.

When the use period is short, it is expected that the user Uz does not want to use the printer use service. When the service period is long, the service printer 3 may not be able to perform appropriate printing due to deterioration over time after continued use of the service. For this reason, when the use period is within the predetermined range, the alternative fee plan information is transmitted to the terminal device 4, and when the use period is not within the predetermined range, the alternative fee plan information is not transmitted to the terminal device 4, so that the service providing system 1000 can present, to the user Uz, the alternative fee plan suitable for the form of use by the user Uz while preventing unnecessary presentation of the alternative fee plan.

The service providing server 1 calculates the income/expense ratio, which is a ratio between the income and the expense generated by the use by the user Uz of the printer use service to determine that the alternative fee plan information is not transmitted to the terminal device 4 when the calculated income/expense ratio is below the predetermined threshold value.

According to this, the alternative fee plan is not presented to the user Uz with the form of use in which the income/expense ratio is below the predetermined threshold value. Therefore, it is possible to prevent the main entity that runs the printer use service from being disadvantaged due to the use by the user Uz of the printer use service.

The service providing server 1 determines that the alternative fee plan information is not transmitted to the terminal device 4 when the usage fee payment status by the user Uz of the printer use service is unpaid.

According to this, the alternative fee plan is not presented to the user Uz who has not paid. Therefore, it is possible to prevent the main entity that runs the printer use service from being disadvantaged due to the use by the user Uz of the printer use service. Further, it is possible to appropriately present the alternative fee plan according to the payment status.

When the predetermined time has elapsed since the alternative fee plan information was transmitted to the terminal device 4 last time, the service providing server 1 transmit the alternative fee plan information to the terminal device 4, and when it is determined that the predetermined time has not elapsed since the alternative fee plan information was transmitted to the terminal device 4 last time, the service providing server 1 does not transmit the alternative fee plan information to the terminal device 4.

When the predetermined time has not elapsed, the user Uz makes a request for withdrawal a plurality of times within the predetermined time. In other words, in this case, the user Uz may make a request for withdrawal a plurality of times in a short period of time and may not want to use the printer use service. For this reason, when the predetermined time has elapsed since the alternative fee plan information was transmitted to the terminal device 4 last time, the alternative fee plan information is transmitted to the terminal device 4, and when the predetermined time has not elapsed, the alternative fee plan information is not transmitted, so that the service providing system 1000 can effectively present the alternative fee plan to the user Uz who may want to use the printer use service while preventing the alternative fee plan from being unnecessarily presented.

When the number of times the alternative fee plan information was transmitted to the terminal device 4 in the past is less than the predetermined number of times, the service providing server 1 transmits the alternative fee plan information to the terminal device 4, and when the number of times the alternative fee plan information was transmitted to the terminal device 4 in the past is equal to or greater than the predetermined number, the service providing server 1 does not transmit the alternative fee plan information to the terminal device 4.

When the alternative fee plan is presented a predetermined number of times, the user Uz makes a request for withdrawal a plurality of times. That is, in this case, the user Uz may not want to use the printer use service. For this reason, when the number of times is equal to or greater than a predetermined number of times, the alternative fee plan information is transmitted, or otherwise, the alternative fee plan information is not transmitted, so that the service providing system 1000 can effectively present the alternative fee plan to the user Uz who may want to use the printer use service while preventing the alternative fee plan from being unnecessarily presented.

The alternative fee plan is different from the fee plan selected by user Uz when joining the printer use service.

The factor that the user Uz withdraws from the printer use service may be that the fee plan selected by the user Uz when the user Uz joins the printer use service is not suitable for the user Uz. For this reason, when the service providing server 1 joins the printer use service, it is possible to present an attractive fee plan for the user Uz by presenting an alternative fee plan different from the fee plan selected by user Uz.

The fee plan is a plan in which at least the usage fee of the printer use service for a given period and the number of printable sheets for a given period are defined.

As a result, the user Uz can be aware of the usage fee and the number of printable sheets suitable for the form of use by the user Uz when the user Uz wants to withdraw from the printer use service.

The embodiment and the modification described above are merely an aspect of the present disclosure, and any modification and application can be made within the scope of the present disclosure.

For example, in the above-described embodiment and modification, the fee plan in which the usage fee per month and the number of printable sheets are defined is illustrated, but the given period indicated by the fee plan is not limited to one month.

Further, for example, in the above-described embodiment and modification, the case where three fee plans are set for each type of printer use service is shown as an example, but more fee plans may be set or less fee plans may be set for each printer use service.

Further, for example, in the above-described embodiment and modification, the case where it is possible to select any of the fourth service fee plan to sixth service fee plan when joining the second printer use service is shown as an example, but only the fourth service fee plan may be selected when joining the second printer use service. With this configuration, in the service providing system 1000, the fifth service fee plan and the sixth service fee plan are presented as the alternative fee plan.

For example, in the above-described embodiment, the serial ink jet printer is illustrated as the service printer 3, but the service printer 3 may be a line-type ink jet printer.

For example, in the above-described embodiment, the case where ink is illustrated as a consumable item in the service printer 3, and the ink is delivered is illustrated. However, the consumable item to be delivered is not limited to ink, and may include, for example, a waste liquid box that stores the ink that is discharged as waste liquid during maintenance of the ink jet head. When the service printer 7 is an electrophotographic printer, the toner may be a consumable item.

For example, the functions of the providing server controller 10, the printer controller 30, and the terminal controller 40 may be implemented by a plurality of processors or semiconductor chips.

Figure 5A:
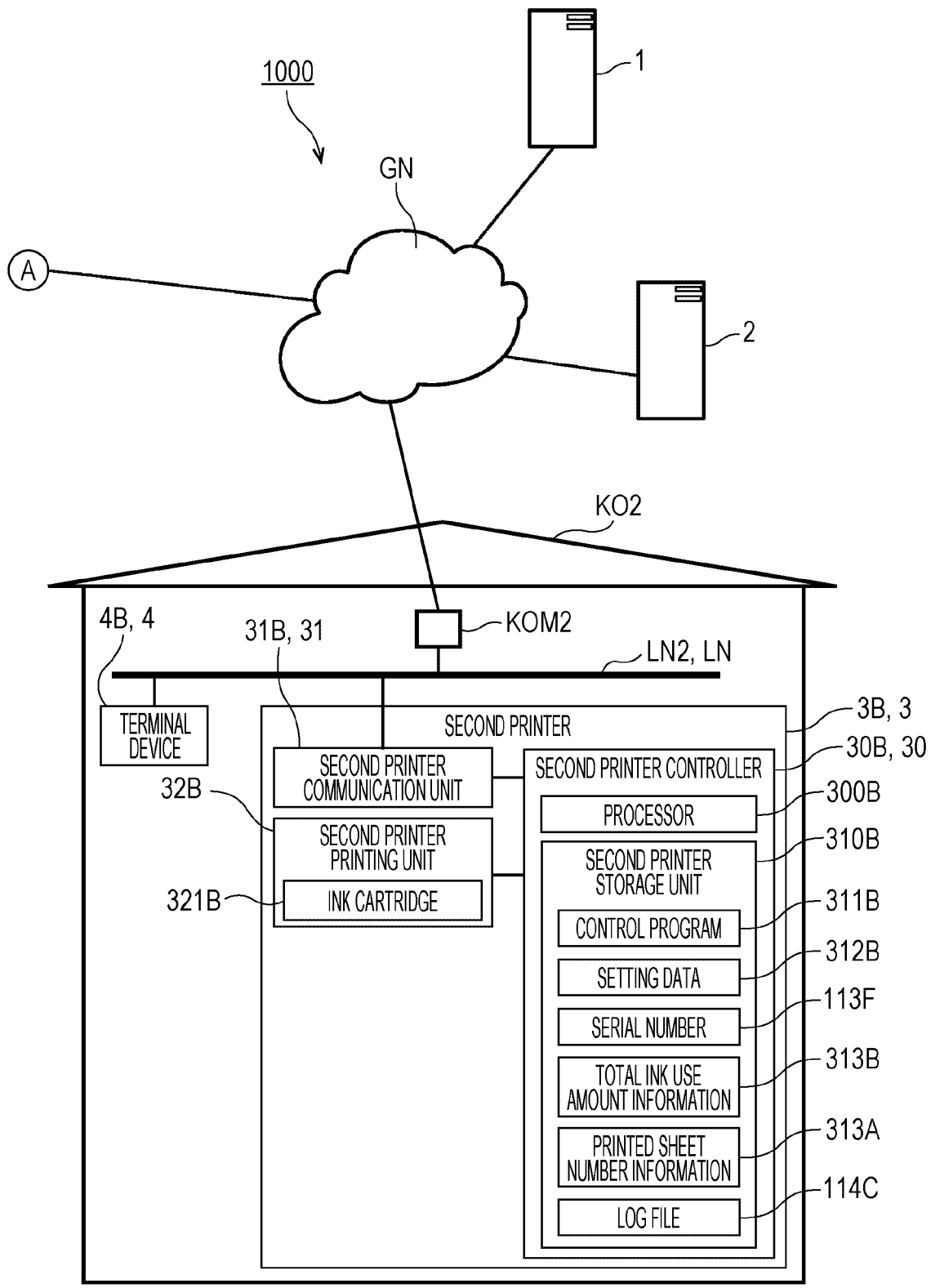
FIG. 5A is a first half of a block diagram showing a functional configuration of a service printer and a terminal device.

Moreover, respective units shown in FIG. 2 and FIGS. 5A and 5B are an example, and the present disclosure is not particularly limited a specific mounting form. That is, it is not necessarily required to implement hardware corresponding to respective units, but it is of course possible to construct a configuration in which the functions of the respective units are implemented by executing a program by one processor. In addition, in the above embodiments, part of the functions implemented by software may be implemented by hardware, or part of the functions implemented by hardware may be implemented by software. In addition, specific detailed configurations of other parts of the service providing system 1000 can be changed in any manner without departing from the scope of the present disclosure.

Further, for example, the step units of the operations shown in FIG. 6 are divided in accordance with the main processing contents in order to facilitate understanding of the operations of the respective devices of the service providing system 1000. Thus, the present disclosure is not limited to how the process is divided into process units or the names of the process units. Depending on the processing contents, the process may be divided into more step units. Further, one step unit may be divided so as to include more processes. In addition, the order of the steps may be changed as appropriate within the scope of the present disclosure.

What is claimed is:

1. A service providing system comprising:
an information processing apparatus that provides a service related to use of a printing apparatus; and
a terminal device configured to communicate with the information processing apparatus, wherein
the terminal device
accepts a request by a user for withdrawal from the service to transmit request-for-withdrawal information indicating the accepted request for withdrawal to the information processing apparatus, wherein
the information processing apparatus,
when receiving the request-for-withdrawal information from the terminal device, determines, based on a form of use by the user of the service, a second fee plan different from a first fee plan which is a fee plan of the service selected by the user when receiving the request-for-withdrawal information, and
transmits second fee plan information indicating the determined second fee plan to the terminal device, and wherein
the terminal device
presents to the user the second fee plan indicated by the second fee plan information received from the information processing apparatus.

2. The service providing system according to claim 1, wherein
the information processing apparatus receives printed sheet number information indicating the number of sheets on which printing is performed by the printing apparatus, and determines the second fee plan based on the printed sheet number information.

3. The service providing system according to claim 2, wherein
the information processing apparatus creates a new fee plan based on the printed sheet number information and the first fee plan, and sets the created fee plan as the second fee plan.

4. The service providing system according to claim 1, wherein
the information processing apparatus
determines whether to transmit the second fee plan information to the terminal device based on the form of use,
transmits the second fee plan information to the terminal device when it is determined that the second fee plan information is transmitted, and
does not transmit the second fee plan information to the terminal device when it is determined that the second fee plan information is not transmitted.

5. The service providing system according to claim 4, wherein
the information processing apparatus
determines that the second fee plan information is transmitted to the terminal device when a period of use by the user of the service is within a predetermined range, and
determines that the second fee plan information is not transmitted to the terminal device when a period of use by the user of the service is not within the predetermined range.

6. The service providing system according to claim 4, wherein
the information processing apparatus
calculates a ratio between an income and an expense generated by use by the user of the service, and determines that the second fee plan information is not transmitted to the terminal device when the calculated ratio is below a predetermined threshold value.

7. The service providing system according to claim 4, wherein
the information processing apparatus
determines that the second fee plan information is not transmitted to the terminal device when a payment status of a fee of use by the user of the service is unpaid.

8. The service providing system according to claim 1, wherein
the information processing apparatus
transmits the second fee plan information to the terminal device when a predetermined time elapses since the second fee plan information was transmitted to the terminal device last time, and
does not transmit the second fee plan information to the terminal device when it is determined that the predetermined time does not elapse since the second fee plan information was transmitted to the terminal device last time.

9. The service providing system according to claim 1, wherein
the information processing apparatus
transmits the second fee plan information to the terminal device when the number of times the second fee plan information was transmitted to the terminal device in the past is less than a predetermined number of times, and
does not transmit the second fee plan information to the terminal device when the number of times the second fee plan information was transmitted to the terminal device in the past is equal to or greater than the predetermined number of times.

10. The service providing system according to claim 1, wherein
the second fee plan is different from the fee plan selected by the user when the user joins the service.

11. The service providing system according to claim 1, wherein
the fee plan is a plan in which at least a usage fee of the service in a given period and the number of printed sheets on which the printing apparatus is configured to perform printing in the given period are defined.

12. A method of controlling a service providing system including an information processing apparatus that provides a service related to use of a printing apparatus, and a terminal device configured to communicate with the information processing apparatus, the method comprising:
the terminal device
accepting a request by a user for withdrawal from the service, and transmitting request-for-withdrawal information indicating the accepted request for withdrawal to the information processing apparatus,
the information processing apparatus,
when receiving the request-for-withdrawal information from the terminal device, determining, based on a form of use by the user of the service, a second fee plan different from a first fee plan which is a fee plan of the service selected by the user when receiving the request-for-withdrawal information, and
transmitting second fee plan information indicating the determined second fee plan to the terminal device; and
the terminal device
presenting to the user the second fee plan indicated by the second fee plan information received from the information processing apparatus.

13. An information processing apparatus that provides a service related to use of a printing apparatus, the information processing apparatus comprising:
a communication unit that receives, from a terminal device that accepts a request by a user for withdrawal from the service, request-for-withdrawal information indicating the request for withdrawal accepted by the terminal device; and
a controller that when the communication unit receives the request-for-withdrawal information from the terminal device, determines, based on a form of use by the user of the service, a second fee plan different from a first fee plan which is a fee plan of the service selected by the user when receiving the request-for-withdrawal information to transmit second fee plan information indicating the determined second fee plan to the terminal device through the communication unit.

* * * * *